United States Patent [19]

Silver et al.

[11] 4,118,358

[45] Oct. 3, 1978

[54] PREPARATION OF OXADIAZOLE COPOLYMER SOLUTION FROM SCRAP COPOLYMER

[75] Inventors: Frank M. Silver; Hartwig C. Bach, both of Pensacola, Fla.

[73] Assignee: Monsanto Company, St. Louis, Mo.

[21] Appl. No.: 776,335

[22] Filed: Mar. 10, 1977

[51] Int. Cl.² ............................................. C08K 5/41
[52] U.S. Cl. .................................. 260/30.8 R; 260/2.3
[58] Field of Search .................. 260/78 R, 78 SC, 2.3, 260/78.41, 30.8 R

[56] References Cited

U.S. PATENT DOCUMENTS 3,644,297  2/1972  Sekiguchi et al. .................. 260/78 R

FOREIGN PATENT DOCUMENTS 1,407,439  9/1975  United Kingdom .................. 260/78 R
1,417,568  12/1975  United Kingdom .................. 260/78 R

*Primary Examiner*—Harold D. Anderson
*Attorney, Agent, or Firm*—John W. Whisler

[57] ABSTRACT

A process for utilizing scrap aromatic oxadiazole/N-alkyhydrazide copolymer by dissolving the scrap copolymer in oleum thereby effecting degradation thereof and heating the resulting solution at a temperature between about 100° C. and 160° C. to form a polymer solution. Articles such as fibers can be shaped from this solution by combining the solution with an aqueous medium such as water.

10 Claims, No Drawings

PREPARATION OF OXADIAZOLE COPOLYMER SOLUTION FROM SCRAP COPOLYMER

BACKGROUND OF THE INVENTION

1. Field of the Invention

This invention relates to reshaping articles from certain scrap copolymer. More specifically, the invention relates to a process for preparing a solution from which articles of a copolymer consisting essentially of recurring units of the formulas

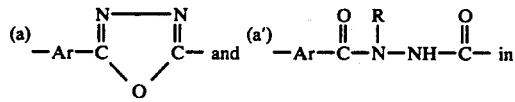

a mole ratio of from 95:5 to 20:80, respectively, wherein Ar is a divalent aromatic radical and R is a $C_1$ to $C_4$ alkyl, can be shaped. The process involves degrading scrap said copolymer in oleum and, heating the resulting solution to form in solution a copolymer consisting essentially of recurring units of the formulas

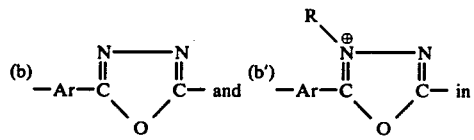

a mole ratio of from 95:5 to 20:80, respectively, wherein Ar and R have the same meaning as defined above. As used herein the term "Copolymer A" refers to the above copolymer consisting essentially of units (a) and (a') and "Copolymer B" refers to the above copolymer consisting essentially of units (b) and (b'). Articles may be shaped from the resulting polymer solution by combining the solution with an aqueous medium (e.g. water or aqueous sulfuric acid) whereby Copolymer B hydrolyzes to yield Copolymer A which coagulates in the aqueous medium.

2. Prior Art

Initially, Copolymer A is prepared by a solution technique in which certain monomers, for example, terephthalic acid, dimethylterephthalate and hydrazine sulfate are reacted in oleum to yield a sulfuric acid solution of Copolymer B. This solution (or dope) is then used to shape articles, such as fibers, by combining the solution with an aqueous medium, for example, water or dilute sulfuric acid whereby Copolymer B hydrolyzes to yield Copolymer A which coagulates in the aqueous medium. Coupled processes for preparing fibers of Copolymer A are described in British Pat. Nos. 1,407,439 and 1,417,568 and U.S. Pat. No. 3,644,297 and in commonly assigned U.S. application Ser. No. 520,503.

When producing shaped articles of Copolymer A, as with most processes for producing shaped articles of polymers, a certain amount of scrap Copolymer A is generated either in the form of rejected articles or waste polymer. Techniques which have been developed in the past for reshaping articles from scrap polymer depend on the polymer being shaped by melt extrusion techniques and/or being soluble in a suitable solvent from which articles can be obtained by solution techniques. Unfortunately, Copolymer A on the one hand cannot be shaped by melt extrusion techniques due to its high melting point and on the other hand it is insoluble in most organic solvents and degrades in sulfuric acid. While Copolymer A will dissolve in hexafluoroisopropanol, this solvent is too costly to be seriously considered as a suitable solvent for large scale operations. Thus, techniques which have been used in the past for reshaping articles from scrap polymer are not suitable for use with scrap Copolymer A.

It is therefore an object of the present invention to provide a process for reshaping articles from scrap Copolymer A.

More specifically, it is an object of the present invention to provide a process for utilizing scrap Copolymer A for preparing a solution from which useful articles of Copolymer A can be shaped.

SUMMARY OF THE INVENTION

The present invention relates to a process whereby useful articles of Copolymer A (i.e. copolymer consisting essentially of recurring units of the formula

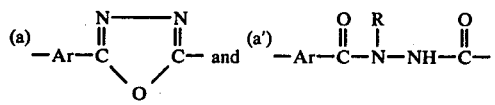

in a mole ratio between about 20:80 and about 95:5 in which Ar is a divalent aromatic radical, such as an arylene radical, and R is a $C_1$ to $C_4$ alkyl) can be obtained from scrap Copolymer A. In accordance with the present invention a process for preparing a polymer solution from which useful articles of Copolymer A can be shaped is provided which comprises degrading scrap Copolymer A in oleum with stirring until a particle-free, homogeneous solution of the degraded polymer is obtained and heating the resulting solution at a temperature between about 100° C. and 160° C. with mixing until a polymer solution is obtained in which the polymer has an inherent viscosity of at least 1.0. The oleum may be heated to a temperature between 100° C. and 160° C. before, during or after Copolymer A is added thereto. The resulting polymer solution consists essentially of Copolymer B in concentrated sulfuric acid and can be shaped into useful articles by the solution techniques described in the art, for example, by extruding the polymer solution into an aqueous medium, such as water or dilute sulfuric acid, whereby Copolymer B hydrolyzes to form Copolymer A which coagulates in the aqueous medium.

It is indeed surprising that Copolymer A can be regenerated following its degradation in oleum, particularly, since the intermediate Copolymer B consisting essentially of recurring units of the formulas

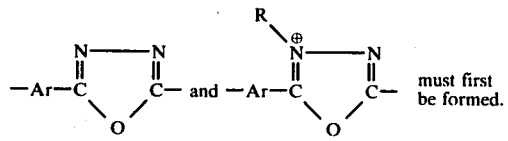 must first be formed.

The degradation of a polymer in oleum normally does not result in products from which the polymer can be regenerated.

DETAILED DESCRIPTION OF THE INVENTION

The polymer solution prepared by the process of the present invention may be shaped into useful articles by solution techniques described in the prior art, such as those described in the above-mentioned prior art.

The starting materials used in practicing process of this invention include scrap Copolymer A and oleum containing sufficient $SO_3$ to combine with any water formed during preparation of the polymer solution, that is, the sulfuric acid solution of Copolymer B. In general, from 2 to 30 parts by weight of scrap Copolymer A is added to 98 to 70 parts by weight, respectively, of oleum containing between 5 and 60% by weight $SO_3$. A certain amount of $SO_3$ is generated upon degradation of Copolymer A in oleum and is available to combine with water formed during the subsequent preparation of Copolymer B in the oleum.

In practicing the process of the invention, the regenerated Copolymer A may contain a greater proportion of

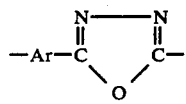

units than the scrap Copolymer A. This proportion may be reduced to a desired level by adding an alkyl source, for example, a methyl source such as methanol or dimethyl sulfate to the oleum at any stage during the process.

Where high molecular weight Copolymer A is desired, hydrazine sulfate may be added to the oleum prior to or during preparation of Copolymer B in an amount corresponding to from 0.1 to 5.0% by weight, based on the weight of scrap Copolymer A added to the oleum, with a range of from about 0.5 to 3.0% being preferred.

From the standpoint of economical considerations, the preferred Copolymer A consists essentially of recurring units of the formulas

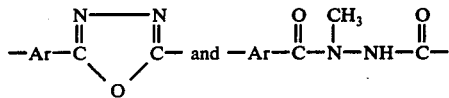

wherein at least 40% of the Ar radicals in the polymer chain are

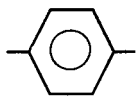

and the balance thereof, if any, is

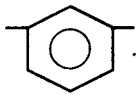

Inherent viscosity ($\eta$inh.) values, when given herein, are measured at 25° C. and are defined by the following equation:

$$\eta\text{inh} = \ln RV/C$$

using a polymer solution having a concentration (c) of 0.2 gram of polymer per 100 ml of solvent. The relative viscosity (RV) is determined by dividing the flow time in a capillary viscometer of the polymer solution by the flow time for the pure solvent. The polymer solution used for the inherent viscosity determinations of Copolymer B is obtained by dilution of a portion or sample of the polymer solution obtained by the process of the invention with an appropriate amount of concentrated sulfuric acid to obtain a solution having a polymer concentration of 0.2 g of polymer per 100 ml of solvent, based on the amount of Copolymer A added to the oleum. The polymer solution used for the inherent viscosity determination of Copolymer A is obtained by dissolving an appropriate amount of Copolymer A in hexafluoroisopropanol.

The following examples are given to further illustrate the invention. In the examples percentages and parts are by weight unless otherwise specified.

EXAMPLE 1

Into an oven-dried three-necked 125 ml Grignard flask equipped with a mechanical stirrer and a calcium sulfate drying tube were placed 2.1457 g (0.0165 mole) of hydrazine sulfate and 25 ml (47.2500 g) of 20% oleum. The mixture was stirred at 60° C. until a clear homogeneous solution was obtained. To this solution was added with stirring at ambient temperature Copolymer A (inherent viscosity of 2.88) consisting of recurring units of formulas

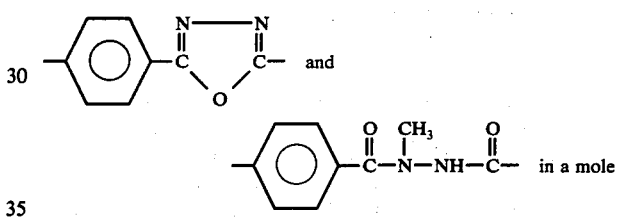

ratio of 51 to 49, respectively, in the form of a chopped fiber. The solids concentration of the resulting solution was 4.6% and the polymer inherent viscosity was 0.404. The low viscosity solution was heated with stirring at 140° C. in a constant temperature oil bath. Increased viscosity was observed with continued heating. Inherent viscosity versus time data are given in Table I.

Table I

| Sample No. | Hours at 140° C. | Inherent Viscosity |
|---|---|---|
| 1. | 0 | 0.4 |
| 2. | 0.5 | 3.6 |
| 3. | 1.5 | 4.6 |
| 4. | 3.0 | 5.1 |
| 5. | 5.0 | 5.0 |

A clear tough film was obtained by coagulation of sample 4 in water. The film was washed with 1% aqueous sodium carbonate to neutralize any sulfuric acid in contact therewith and then washed with water to remove excess sodium carbonate. The remaining Copolymer B solution was extruded into water from a syringe to form strong fiber which was washed in the same manner as the film. Infrared analysis of the film showed it to be of the same structural compositions as the scrap fiber used in its preparation.

EXAMPLE 2

This example illustrates the effect of adding hydrazine sulfate on the inherent viscosity of Copolymer B.

In a first run 20 g of chopped fiber of p-phenylene-1,3,4-oxadiazole/p-phenylene-N-methylhydrazide copolymer was dissolved with cooling (−5° C. methanol- /ice bath) at about 18% solids level by stirring into 20% oleum containing 0.324 g of hydrazine sulfate in a manner similar to that described in EXAMPLE 1. The resulting solution having a polymer inherent viscosity of 0.4 was then heated with stirring at 140° C. for 3 hours in a constant temperature oil bath. The resulting solution had a polymer inherent viscosity of 3.6.

In a second run, the above procedure was repeated except that 3.24 g of hydrazine sulfate was added instead of 0.324 g and the solution was heated at 140° C. for 1 hour instead of 3. In this instance the solution had a polymer inherent viscosity of 0.5 before heating and 4.4 after heating.

In a third run, run 1 was repeated except that no hydrazine sulfate was added. In this instance the solution had a polymer inherent viscosity of 0.4 before heating and 1.4 after heating.

When the above runs are repeated with the exception that a methylating agent such as dimethylsulfate is added along with the chopped fiber, the copolymer obtained from the polymer solution will have a greater percentage of p-phenylene-N-methylhydrazide units than when the agent is omitted.

We claim:

1. A process for preparing a sulfuric acid solution of a copolymer consisting essentially of recurring structural units of the formulas

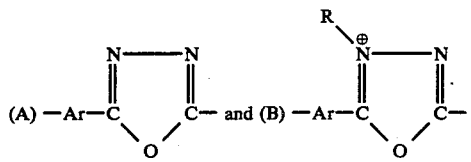

in a mole ratio in the range of 20:80 to 95:5, respectively, where Ar is a divalent aromatic radical and R is a $C_1$ to $C_4$ alkyl, comprising, degrading in oleum scrap copolymer consisting essentially of recurring structural units of the formulas

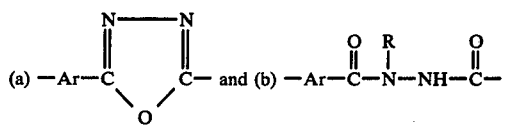

in a mole ratio in the range of 20:80 to 95:5, respectively, where Ar and R are as previously defined, with stirring until a solution is obtained and then heating said solution at a temperature between about 100° and 160° C. with stirring for a period of time sufficient to provide a fiber forming polymer solution.

2. The process of claim 1 wherein said oleum contains between 5% and 60% sulfur trioxide.

3. The process of claim 1 wherein said oleum contains dissolved hydrazine sulfate.

4. The process of claim 3 wherein the amount of said hydrazine sulfate ranges from 0.5% to 3%, based on the weight of said copolymer.

5. The process of claim 3 wherein Ar and Ar' are para-phenylene and R is methyl.

6. The process of claim 5 wherein the mole ratio of (a) units to (b) units is between 40:60 and 80:20.

7. The process of claim 1 wherein the weight ratio of said scrap copolymer to oleum is between 2:98 and 30:70.

8. The process of claim 1 wherein an alkylating agent is added to said oleum.

9. The process of claim 8, wherein said alkylating agent is dialkylsulfate.

10. The process of claim 5, wherein dimethylsulfate is added to said oleum.

* * * * *